(12) United States Patent
Stamenov et al.

(10) Patent No.: US 12,422,682 B2
(45) Date of Patent: Sep. 23, 2025

(54) ADJUSTING A TUNABLE LENS IN AN ELECTRONIC DEVICE

(71) Applicant: Apple Inc., Cupertino, CA (US)

(72) Inventors: Igor Stamenov, San Ramon, CA (US); Gareth D Hastings, San Jose, CA (US); James E Pedder, Oxon (GB); Jason Chen, Sunnyvale, CA (US); Matthew D Hollands, Cambridge (GB); Amrith V Ram, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/625,114

(22) Filed: Apr. 2, 2024

(65) Prior Publication Data

US 2024/0369841 A1    Nov. 7, 2024

Related U.S. Application Data

(60) Provisional application No. 63/515,505, filed on Jul. 25, 2023, provisional application No. 63/499,906, filed on May 3, 2023.

(51) Int. Cl.
*G02B 27/01*    (2006.01)
*G02B 3/14*    (2006.01)
(Continued)

(52) U.S. Cl.
CPC ........... *G02B 27/0172* (2013.01); *G02B 3/14* (2013.01); *G02B 27/0093* (2013.01); *G02F 1/294* (2021.01); *G02B 2027/0138* (2013.01)

(58) Field of Classification Search
CPC .. G02B 27/0172; G02B 3/14; G02B 27/0093; G02B 2027/0138; G02B 27/0176;
(Continued)

(56) References Cited

U.S. PATENT DOCUMENTS 9,057,826 B2    6/2015 Gupta et al.
9,304,319 B2    4/2016 Bar-Zeev et al.
(Continued)

OTHER PUBLICATIONS

Dmitry Domkin et al., Effect of ciliary-muscle contraction force on trapezius muscle activity during computer mouse work, European Journal of Applied Physiology, 2019, pp. 389-397, Springer.

*Primary Examiner* — Richard J Hong
(74) *Attorney, Agent, or Firm* — Treyz Law Group, P.C.; Joseph F. Guihan

(57) ABSTRACT

An electronic device may include a lens module with a tunable lens. The tunable lens may be operable in multiple modes such as a normal mode, a presbyopia-mitigation mode, a near-focus mode, and a negative power boost mode. During operation, the electronic device may gather data and adjust the tunable lens based on the gathered data. The tunable lens may be switched from the normal mode to the presbyopia-mitigation mode in response to determining that a nearby object is being viewed through the lens module. The tunable lens may be switched from the normal mode to the negative power boost mode in response to ambient light levels being low and/or eye fatigue levels being high. The tunable lens may switch between modes over a transition period. An output device may notify the user when the tunable lens changes modes.

20 Claims, 8 Drawing Sheets

(51) Int. Cl.
*G02B 27/00* (2006.01)
*G02F 1/29* (2006.01)

(58) Field of Classification Search
CPC .. G02B 27/0075; G02B 26/004; G02B 30/34; G02F 1/294; G06F 3/013; G06F 3/14; G06F 3/0484; G06F 3/017; G06T 5/00; G09G 3/003

See application file for complete search history.

(56) References Cited

U.S. PATENT DOCUMENTS

| | | | |
|---|---|---|---|
| 9,681,804 | B2 | 6/2017 | Spitzer |
| 10,241,569 | B2 | 3/2019 | Lanman et al. |
| 10,775,628 | B2 | 9/2020 | Samec et al. |
| 10,881,287 | B1 | 1/2021 | Ouderkirk et al. |
| 10,928,638 | B2 | 2/2021 | Ninan et al. |
| 10,948,801 | B1 * | 3/2021 | Lu .................. G02B 27/0172 |
| 2011/0227813 | A1 | 9/2011 | Haddick et al. |
| 2013/0033485 | A1 * | 2/2013 | Kollin ................. G06F 3/0484 345/660 |
| 2015/0055084 | A1 * | 2/2015 | Stevens .................. G02B 3/14 359/666 |
| 2015/0331237 | A1 * | 11/2015 | Itani ....................... G02B 30/34 359/466 |
| 2016/0193104 | A1 | 7/2016 | Du |
| 2016/0209648 | A1 | 7/2016 | Haddick et al. |
| 2017/0161951 | A1 * | 6/2017 | Fix ........................... G06T 5/00 |
| 2017/0168307 | A1 * | 6/2017 | Itani ....................... G09G 3/003 |
| 2017/0336637 | A1 | 11/2017 | Van Heugten |
| 2017/0344114 | A1 | 11/2017 | Osterhout et al. |
| 2017/0366951 | A1 * | 12/2017 | Kweon .................... G06F 3/14 |
| 2018/0188556 | A1 | 7/2018 | Portney |
| 2019/0155381 | A1 * | 5/2019 | Itani .................. G02B 27/0172 |
| 2019/0302479 | A1 * | 10/2019 | Smyth .................. G02B 26/004 |
| 2019/0346918 | A1 * | 11/2019 | Akkaya .............. G02B 27/0075 |
| 2020/0096770 | A1 | 3/2020 | Pedder et al. |
| 2020/0174284 | A1 | 6/2020 | Chan et al. |
| 2021/0311315 | A1 * | 10/2021 | Itani ........................ G06F 3/013 |
| 2021/0333506 | A1 * | 10/2021 | Maric ................ G02B 27/0176 |
| 2022/0398953 | A1 * | 12/2022 | Sears ...................... G06F 3/013 |
| 2023/0057524 | A1 | 2/2023 | Stipe et al. |
| 2023/0351931 | A1 * | 11/2023 | Sears ................ G02B 27/0172 |
| 2024/0219728 | A1 * | 7/2024 | Itani ........................ G06F 3/017 |

* cited by examiner

ADJUSTING A TUNABLE LENS IN AN ELECTRONIC DEVICE

This application claims the benefit of U.S. provisional patent application No. 63/515,505, filed Jul. 25, 2023, and U.S. provisional patent application No. 63/499,906, filed May 3, 2023, which are hereby incorporated by reference herein in their entireties.

BACKGROUND

This relates generally to electronic devices and, more particularly, to wearable electronic device systems.

Electronic devices are sometimes configured to be worn by users. For example, head-mounted devices are provided with head-mounted structures that allow the devices to be worn on users' heads. The head-mounted devices may include optical systems with lenses.

Head-mounted devices typically include lenses with fixed shapes and properties. If care is not taken, it may be difficult to adjust these types of lenses to optimally present content to each user of the head-mounted device.

SUMMARY

An electronic device may include a head-mounted support structure, one or more sensors coupled to the head-mounted support structure, and a lens module coupled to the head-mounted support structure. The lens module may include a tunable lens that is configured to, in response to a determination, based on data from the one or more sensors, that a nearby object is being viewed through the lens module, change from a first mode in which the lens module has a first spherical power to a second mode in which the lens module has a second spherical power that is greater than the first spherical power.

An electronic device may include a head-mounted support structure, one or more sensors coupled to the head-mounted support structure, and a lens module coupled to the head-mounted support structure. The lens module may include a tunable lens that is configured to, based on data from the one or more sensors, change from a first mode in which the lens module has a first spherical power to a second mode in which the lens module has a second spherical power that is less than the first spherical power.

An electronic device may include a head-mounted support structure, a lens module coupled to the head-mounted support structure that includes a tunable lens that is configured to change from a first mode in which the lens module has a first spherical power to a second mode in which the lens module has a second spherical power that is different than the first spherical power, and an output device coupled to the head-mounted support structure. The output device may be configured to provide output indicating that the tunable lens is changing from the first mode to the second mode.

DETAILED DESCRIPTION

Figure 1:
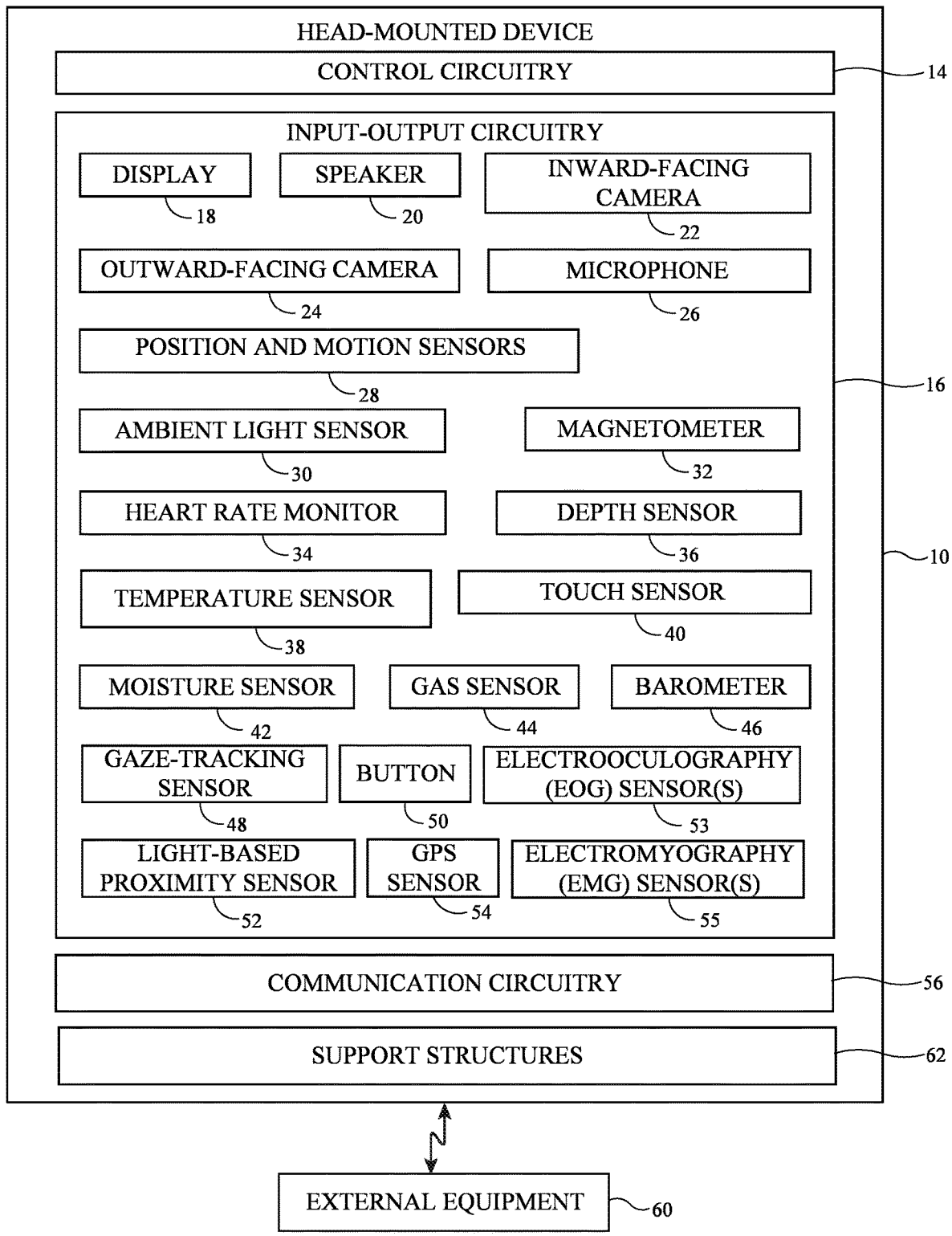
FIG. 1 is a schematic diagram of an illustrative electronic device in accordance with some embodiments.

A schematic diagram of an illustrative electronic device is shown in FIG. 1. As shown in FIG. 1, electronic device 10 (sometimes referred to as head-mounted device 10, system 10, head-mounted display 10, etc.) may have control circuitry 14. In addition to being a head-mounted device, electronic device 10 may be other types of electronic devices such as a cellular telephone, laptop computer, speaker, computer monitor, electronic watch, tablet computer, etc. Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 16. Input-output circuitry 16 may be used to allow a user to provide head-mounted device 10 with user input. Input-output circuitry 16 may also be used to gather information on the environment in which head-mounted device 10 is operating. Output components in circuitry 16 may allow head-mounted device 10 to provide a user with output.

As shown in FIG. 1, input-output circuitry 16 may include a display such as display 18. Display 18 may be used to display images for a user of head-mounted device 10. Display 18 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 18 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 18 is opaque, the display may also optionally display entirely computer-generated content (e.g., without displaying images of the physical environment).

Display 18 may include one or more optical systems (e.g., lenses) (sometimes referred to as optical assemblies) that allow a viewer to view images on display(s) 18. A single display 18 may produce images for both eyes or a pair of displays 18 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

The example of device 10 including a display is merely illustrative and display(s) 18 may be omitted from device 10 if desired. Device 10 may include an optical pass-through area where real-world content is viewable to the user either directly or through a tunable lens.

Input-output circuitry 16 may include various other input-output devices. For example, input-output circuitry 16 may include one or more speakers 20 that are configured to play audio and one or more microphones 26 that are configured to capture audio data from the user and/or from the physical environment around the user.

Input-output circuitry 16 may also include one or more cameras such as an inward-facing camera 22 (e.g., that face the user's face when the head-mounted device is mounted on the user's head) and an outward-facing camera 24 (that face the physical environment around the user when the head-mounted device is mounted on the user's head). Cameras 22 and 24 may capture visible light images, infrared images, or images of any other desired type. The cameras may be stereo cameras if desired. Inward-facing camera 22 may capture images that are used for gaze-detection operations, in one possible arrangement. Outward-facing camera 24 may capture pass-through video for head-mounted device 10.

As shown in FIG. 1, input-output circuitry 16 may include position and motion sensors 28 (e.g., compasses, gyroscopes, accelerometers, and/or other devices for monitoring the location, orientation, and movement of head-mounted device 10, satellite navigation system circuitry such as Global Positioning System circuitry for monitoring user location, etc.). Using sensors 28, for example, control circuitry 14 can monitor the current direction in which a user's head is oriented relative to the surrounding environment (e.g., a user's head pose). One or more of cameras 22 and 24 may also be considered part of position and motion sensors 28. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 16 may also include other sensors and input-output components if desired. As shown in FIG. 1, input-output circuitry 16 may include an ambient light sensor 30. The ambient light sensor may be used to measure ambient light levels around head-mounted device 10. The ambient light sensor may measure light at one or more wavelengths (e.g., different colors of visible light and/or infrared light).

Input-output circuitry 16 may include a magnetometer 32. The magnetometer may be used to measure the strength and/or direction of magnetic fields around head-mounted device 10.

Input-output circuitry 16 may include a heart rate monitor 34. The heart rate monitor may be used to measure the heart rate of a user wearing head-mounted device 10 using any desired techniques.

Input-output circuitry 16 may include a depth sensor 36. The depth sensor may be a pixelated depth sensor (e.g., that is configured to measure multiple depths across the physical environment) or a point sensor (that is configured to measure a single depth in the physical environment). The depth sensor (whether a pixelated depth sensor or a point sensor) may use phase detection (e.g., phase detection autofocus pixel(s)) or light detection and ranging (LIDAR) to measure depth. Any combination of depth sensors may be used to determine the depth of physical objects in the physical environment.

Input-output circuitry 16 may include a temperature sensor 38. The temperature sensor may be used to measure the temperature of a user of head-mounted device 10, the temperature of head-mounted device 10 itself, or an ambient temperature of the physical environment around head-mounted device 10.

Input-output circuitry 16 may include a touch sensor 40. The touch sensor may be, for example, a capacitive touch sensor that is configured to detect touch from a user of the head-mounted device.

Input-output circuitry 16 may include a moisture sensor 42. The moisture sensor may be used to detect the presence of moisture (e.g., water) on, in, or around the head-mounted device.

Input-output circuitry 16 may include a gas sensor 44. The gas sensor may be used to detect the presence of one or more gases (e.g., smoke, carbon monoxide, etc.) in or around the head-mounted device.

Input-output circuitry 16 may include a barometer 46. The barometer may be used to measure atmospheric pressure, which may be used to determine the elevation above sea level of the head-mounted device.

Input-output circuitry 16 may include a gaze-tracking sensor 48 (sometimes referred to as gaze-tracker 48 and gaze-tracking system 48). The gaze-tracking sensor 48 may include a camera and/or other gaze-tracking sensor components (e.g., light sources that emit beams of light so that reflections of the beams from a user's eyes may be detected) to monitor the user's eyes. Gaze-tracker 48 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 48 is merely illustrative.

Input-output circuitry 16 may include a button 50. The button may include a mechanical switch that detects a user press during operation of the head-mounted device.

Input-output circuitry 16 may include a light-based proximity sensor 52. The light-based proximity sensor may include a light source (e.g., an infrared light source) and an image sensor (e.g., an infrared image sensor) configured to detect reflections of the emitted light to determine proximity to nearby objects.

Input-output circuitry 16 may include one or more electrooculography (EOG) sensors 53. Electrooculography is a technique for measuring the electric potential between the front and back of the human eye. To measure the electric potential, one or more pairs of electrodes may be placed in contact with the skin on opposing sides of the eye (e.g., above and below the eye or on the left and right sides of the eye). Herein, electrodes used to measure electric potential for electrooculography may be referred to as electrooculography sensors or EOG sensors.

Input-output circuitry 16 may include a global positioning system (GPS) sensor 54. The GPS sensor may determine location information for the head-mounted device. The GPS sensor may include one or more antennas used to receive GPS signals. The GPS sensor may be considered a part of position and motion sensors 28.

Input-output circuitry 16 may include one or more electromyography (EMG) sensors 55. Electromyography is a technique for measuring electrical activity in response to a nerve's stimulation of a muscle. The electromyography sensors may therefore be able to determine when a muscle is engaged. To measure the electrical activity associated with a muscle, one or more pairs of electrodes may be placed in contact with the skin. Herein, electrodes used to measure electric potential for electromyography may be referred to as electromyography sensors or EMG sensors.

Input-output circuitry 16 may include any other desired components (e.g., capacitive proximity sensors, other proximity sensors, strain gauges, pressure sensors, audio components, haptic output devices such as vibration motors, light-emitting diodes, other light sources, etc.).

Head-mounted device 10 may also include communication circuitry 56 to allow the head-mounted device to communicate with external equipment (e.g., a tethered computer, a portable device such as a handheld device or laptop computer, one or more external servers, or other electrical equipment). Communication circuitry 56 may be used for both wired and wireless communication with external equipment.

Communication circuitry 56 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 56 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHZ), a cellular low-midband (LMB) (e.g., 1400 to 1550 MHz), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHz), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHZ and/or a second UWB communications band at 8.0 GHZ), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHz and 40 GHz, a $K_u$ communications band between about 12 GHZ and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHZ (e.g., WiGig or 60 GHz Wi-Fi bands around 57-61 GHZ), and/or $5^{th}$ generation mobile networks or $5^{th}$ generation wireless systems (5G) New Radio (NR) Frequency Range 2 (FR2) communications bands between about 24 GHz and 90 GHz.

Antennas in wireless communications circuitry 56 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

During operation, head-mounted device 10 may use communication circuitry 56 to communicate with external equipment 60. External equipment 60 may include one or more external servers, an electronic device that is paired with head-mounted device 10 (such as a cellular telephone, a laptop computer, a speaker, a computer monitor, an electronic watch, a tablet computer, earbuds, etc.), a vehicle, an internet of things (IoT) device (e.g., remote control, light switch, doorbell, lock, smoke alarm, light, thermostat, oven, refrigerator, stove, grill, coffee maker, toaster, microwave, etc.), etc.

Electronic device 10 may have housing structures (e.g., housing walls, straps, etc.), as shown by illustrative support structures 62 of FIG. 1. In configurations in which electronic device 10 is a head-mounted device (e.g., a pair of glasses, goggles, a helmet, a hat, etc.), support structures 62 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support control circuitry 14, input-output circuitry 16, and/or communication circuitry 56.

Figure 2:
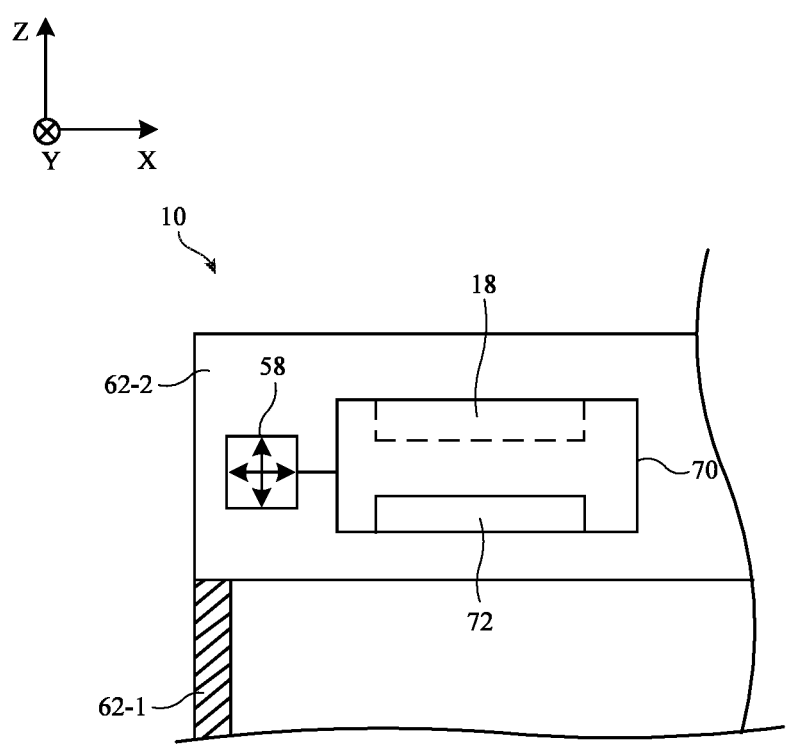
FIG. 2 is a top view of an illustrative head-mounted device with a lens module in accordance with some embodiments.

FIG. 2 is a top view of electronic device 10 in an illustrative configuration in which electronic device 10 is a head-mounted device. As shown in FIG. 2, electronic device 10 may include support structures (see, e.g., support structures 62 of FIG. 1) that are used in housing the components of device 10 and mounting device 10 onto a user's head. These support structures may include, for example, structures that form housing walls and other structures for main unit 62-2 (e.g., exterior housing walls, lens module structures, etc.) and eyeglass temples or other supplemental support structures such as structures 62-1 that help to hold main unit 62-2 on a user's face.

The electronic device may include optical modules such as optical module 70. The electronic device may include left and right optical modules that correspond respectively to a user's left eye and right eye. An optical module corresponding to the user's left eye is shown in FIG. 2.

Each optical module 70 includes a corresponding lens module 72 (sometimes referred to as lens stack-up 72, lens 72, or adjustable lens 72). Lens 72 may include one or more lens elements arranged along a common axis. Each lens element may have any desired shape and may be formed from any desired material (e.g., with any desired refractive index). The lens elements may have unique shapes and refractive indices that, in combination, focus light (e.g., from a display or from the physical environment) in a desired manner. Each lens element of lens module 72 may be formed from any desired material (e.g., glass, a polymer material such as polycarbonate or acrylic, a crystal such as sapphire, etc.).

Modules 70 may optionally be individually positioned relative to the user's eyes and relative to some of the housing wall structures of main unit 26-2 using positioning circuitry such as positioner 58. Positioner 58 may include stepper motors, piezoelectric actuators, motors, linear electromagnetic actuators, and/or other electronic components for adjusting the position of displays, the optical modules 70, and/or lens modules 72. Positioners 58 may be controlled by control circuitry 14 during operation of device 10. For example, positioners 58 may be used to adjust the spacing between modules 70 (and therefore the lens-to-lens spacing between the left and right lenses of modules 70) to match the interpupillary distance IPD of a user's eyes. In another example, the lens module may include an adjustable lens element. The curvature of the adjustable lens element may be adjusted in real time by positioner(s) 58 to compensate for a user's eyesight and/or viewing conditions.

Each optical module may optionally include a display such as display 18 in FIG. 2. As previously mentioned, the displays may be omitted from device 10 if desired. In this type of arrangement, the device may still include one or more lens modules 72 (e.g., through which the user views the real world). In this type of arrangement, real-world content may be selectively focused for a user.

Figure 3:
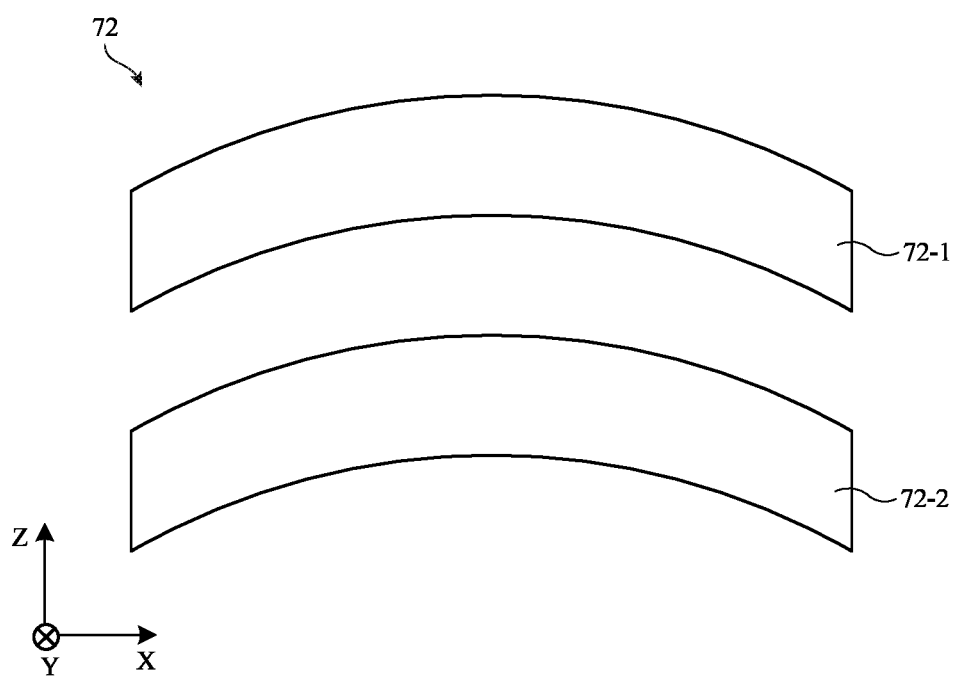
FIG. 3 is a side view of an illustrative lens module in accordance with some embodiments.

FIG. 3 is a cross-sectional side view of an illustrative lens module with multiple lens elements. As shown, lens module 72 includes a first lens element 72-1 and a second lens element 72-2. Each surface of the lens elements may have any desired curvature. For example, each surface may be a convex surface (e.g., a spherically convex surface, a cylindrically convex surface, or an aspherically convex surface), a concave surface (e.g., a spherically concave surface, a cylindrically concave surface, or an aspherically concave surface), a combination of convex and concave surfaces, or a freeform surface. A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In some cases, one of the lens surfaces may have an aspheric surface that changes from being convex (e.g., at the center) to concave (e.g., at the edges) at different positions on the surface. This type of surface may be referred to as an aspheric surface, a primarily convex (e.g., the majority of the surface is convex and/or the surface is convex at its center) aspheric surface, a freeform surface, and/or a primarily convex (e.g., the majority of the surface is convex and/or the surface is convex at its center) freeform surface. A freeform surface may include both convex and concave portions and/or curvatures defined by polynomial series and expansions. Alternatively, a freeform surface may have varying convex curvatures or varying concave curvatures (e.g., different portions with different radii of curvature, portions with curvature in one direction and different portions with curvature in two directions, etc.). Herein, a freeform surface that is primarily convex (e.g., the majority of the surface is convex and/or the surface is convex at its center) may sometimes still be referred to as a convex surface and a freeform surface that is primarily concave (e.g., the majority of the surface is concave and/or the surface is concave at its center) may sometimes still be referred to as a concave surface. In one example, shown in FIG. 3, lens element 72-1 has a convex surface that faces display 18 and an opposing concave surface. Lens element 72-2 has a convex surface that faces lens element 72-1 and an opposing concave surface.

One or both of lens elements 72-1 and 72-2 may be adjustable. In one example, lens element 72-1 is a non-adjustable lens element whereas lens element 72-2 is an adjustable lens element. The adjustable lens element 72-2 may be used to accommodate a user's eyeglass prescription, for example. The shape of lens element 72-2 may be adjusted if a user's eyeglass prescription changes (without needing to replace any of the other components within device 10). As another possible use case, a first user with a first eyeglass prescription (or no eyeglass prescription) may use device 10 with lens element 72-2 having a first shape and a second, different user with a second eyeglass prescription may use device 10 with lens element 72-2 having a second shape that is different than the first shape. Lens element 72-2 may have varying lens power and/or may provide varying amounts and orientations of astigmatism correction to provide prescription correction for the user.

The example of lens module 72 including two lens elements is merely illustrative. In general, lens module 72 may include any desired number of lens elements (e.g., one, two, three, four, more than four, etc.). Any subset or all of the lens elements may optionally be adjustable. Any of the adjustable lens elements in the lens module may optionally be fluid-filled adjustable lenses. Lens module 72 may also include any desired additional optical layers (e.g., partially reflective mirrors that reflect 50% of incident light, linear polarizers, retarders such as quarter wave plates, reflective polarizers, circular polarizers, reflective circular polarizers, etc.) to manipulate light that passes through lens module.

In one possible arrangement, lens element 72-1 may be a removable lens element. In other words, a user may be able to easily remove and replace lens element 72-1 within optical module 70. This may allow lens element 72-1 to be customizable. If lens element 72-1 is permanently affixed to the lens assembly, the lens power provided by lens element 72-1 cannot be easily changed. However, by making lens element 72-1 customizable, a user may select a lens element 72-1 that best suits their eyes and place the appropriate lens element 72-1 in the lens assembly. The lens element 72-1 may be used to accommodate a user's eyeglass prescription, for example. A user may replace lens element 72-1 with an updated lens element if their eyeglass prescription changes (without needing to replace any of the other components within electronic device 10). Lens element 72-1 may have varying lens power and/or may provide varying amount of astigmatism correction to provide prescription correction for the user. Lens element 72-1 may include one or more attachment structures that are configured to attach to corresponding attachment structures included in optical module 70, lens element 72-2, support structures 26, or another structure in electronic device 10.

In contrast with lens element 72-1, lens element 72-2 may not be a removable lens element. Lens element 72-2 may therefore sometimes be referred to as a permanent lens element, non-removable lens element, etc. The example of lens element 72-2 being a non-removable lens element is merely illustrative. In another possible arrangement, lens element 72-2 may also be a removable lens element (similar to lens element 72-1).

As previously mentioned, one or more of the adjustable lens elements may be a fluid-filled lens element. An example is described herein where lens element 72-2 from FIG. 3 is a fluid-filled lens element. When lens element 72-2 is a fluid-filled lens element, the lens element may include one or more components that define the surfaces of lens element 72-2. These elements may also be referred to as lens elements. In other words, adjustable lens element 72-2 (sometimes referred to as adjustable lens module 72-2, adjustable lens 72-2, tunable lens 72-2, etc.) may be formed by multiple respective lens elements.

Figure 4:
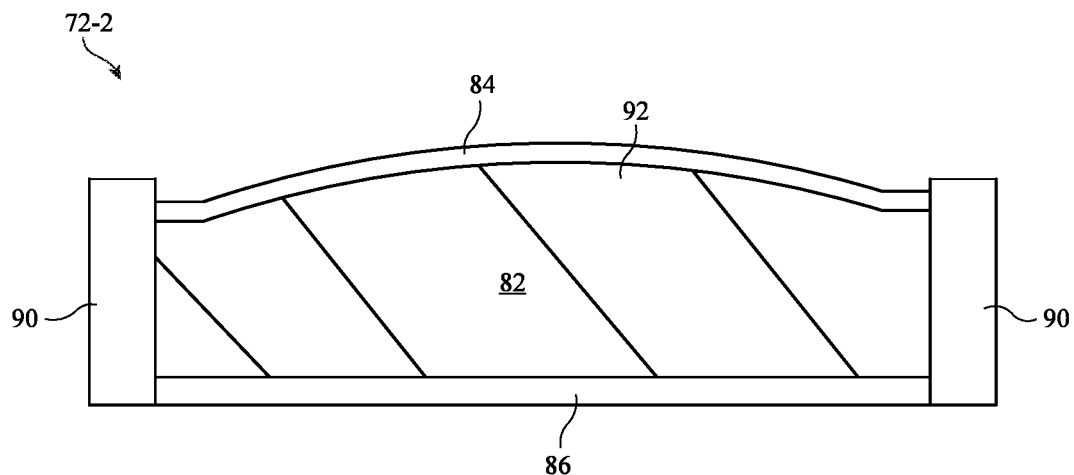
FIGS. 4 and 5 are side views of an illustrative tunable lens in different tuning states in accordance with some embodiments.

FIG. 4 is a cross-sectional side view of adjustable fluid-filled lens element 72-2. As shown, fluid-filled chamber 82 (sometimes referred to as chamber 82 or fluid chamber 82) that includes fluid 92 is interposed between lens elements 84 and 86. Fluid 92 may be a liquid, gel, or gas with a pre-determined index of refraction (and may therefore sometimes be referred to as liquid 92, gel 92, or gas 92). The fluid may sometimes be referred to as an index-matching oil, an optical oil, an optical fluid, an index-matching material, an index-matching liquid, etc. Lens elements 84 and 86 may have the same index of refraction or may have different indices of refraction. Fluid 92 that fills chamber 82 between lens elements 84 and 86 may have an index of refraction that is the same as the index of refraction of lens element 84 but different from the index of refraction of lens element 86, may have an index of refraction that is the same as the index of refraction of lens element 86 but different from the index of refraction of lens element 84, may have an index of refraction that is the same as the index of refraction of lens element 84 and lens element 86, or may have an index of refraction that is different from the index of refraction of lens element 84 and lens element 86. Lens elements 84 and 86 may have a circular footprint, may have an elliptical footprint, may have or may have a footprint any another desired shape (e.g., an irregular footprint).

The amount of fluid 92 in chamber 82 may have a constant volume or an adjustable volume. If the amount of fluid is adjustable, the lens module may also include a fluid reservoir and a fluid controlling component (e.g., a pump, stepper motor, piezoelectric actuator, motor, linear electromagnetic actuator, and/or other electronic component that applies a force to the fluid in the fluid reservoir) for selectively transferring fluid between the fluid reservoir and the chamber.

Lens elements 84 and 86 may be transparent lens elements formed from any desired material (e.g., glass, a polymer material such as polycarbonate or acrylic, a crystal such as sapphire, etc.). Each one of lens elements 84 and 86 may be elastomeric, semi-rigid, or rigid. Elastomeric lens elements may be formed from a natural or synthetic polymer that has a low Young's modulus for high flexibility. For example the elastomeric membrane may be formed from a material having a Young's modulus of less than 1 GPa, less than 0.5 GPa, less than 0.1 GPa, etc.

Semi-rigid lens elements may be formed from a semi-rigid material that is stiff and solid, but not inflexible. A semi-rigid lens element may, for example, be formed from a thin layer of polymer or glass. Semi-rigid lens elements may be formed from a material having a Young's modulus that is greater than 1 Gpa, greater than 2 GPa, greater than 3 GPa, greater than 10 GPa, greater than 25 GPa, etc. Semi-rigid lens elements may be formed from polycarbonate, polyethylene terephthalate (PET), polymethylmethacrylate (PMMA), acrylic, glass, or any other desired material. The properties of semi-rigid lens elements may result in the lens element becoming rigid along a first axis when the lens element is curved along a second axis perpendicular to the first axis or, more generally, for the product of the curvature along its two principal axes of curvature to remain roughly constant as it flexes. This is in contrast to an elastomeric lens element, which remains flexible along a first axis even when the lens element is curved along a second axis perpendicular to the first axis. The properties of semi-rigid lens elements may allow the semi-rigid lens elements to form a cylindrical lens with tunable lens power and a tunable axis.

Rigid lens elements may be formed from glass, a polymer material such as polycarbonate or acrylic, a crystal such as sapphire, etc. In general, the rigid lens elements may not deform when pressure is applied to the lens elements within the lens module. In other words, the shape and position of the rigid lens elements may be fixed. Each surface of a rigid lens element may be planar, concave (e.g., spherically, aspherically, or cylindrically concave), or convex (e.g., spherically, aspherically, or cylindrically convex). Rigid lens elements may be formed from a material having a Young's modulus that is greater than 25 GPa, greater than 30 GPa, greater than 40 GPa, greater than 50 GPa, etc.

One or more structures such as a lens housing 90 (sometimes referred to as housing 90, lens chassis 90, chassis 90, support structure 90, etc.) may also define the fluid-filled chamber 82 of lens element 72-2.

Figure 5:
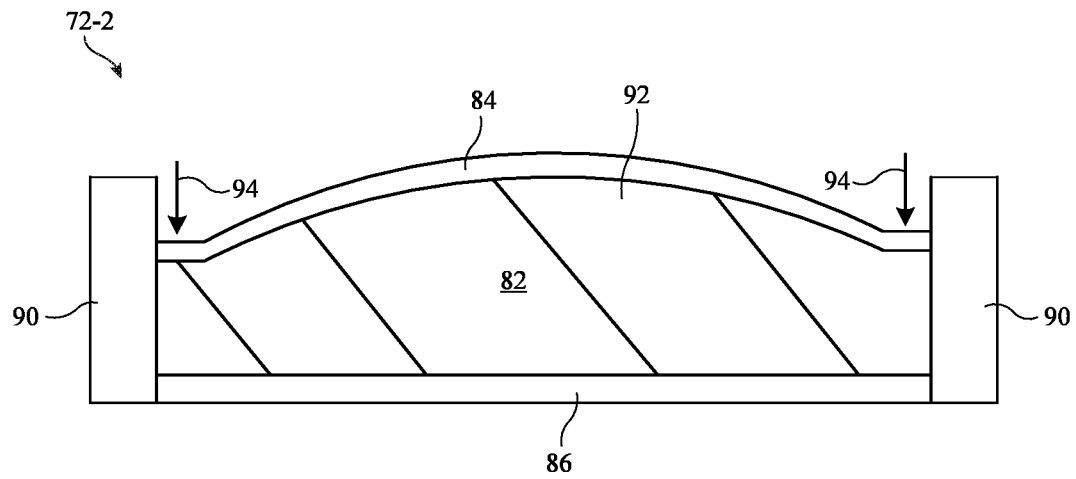

FIG. 5 is a cross-sectional side view of lens element 72-2 showing an illustrative adjustment of the shape of lens element 72-2. As shown, during adjustments of lens element 72-2, lens element 84 may be biased in direction 94 at multiple points along its periphery (e.g., a point force is applied in direction 94 at multiple points). In this way, the curvature of the lens element 84 (and accordingly, the lens power of lens element 72-2) may be adjusted.

There are multiple options for how to manipulate the shape of lens element 84. In one possible arrangement, a plurality of actuators (e.g., linear actuators) may be coupled to the periphery of the lens element. The actuators may be distributed evenly around the periphery of the lens element 84, as one example. Each actuator (e.g., a linear actuator) may be coupled to a respective portion of lens element 84 and may selectively move that respective portion of lens element 84 up and down (e.g., in the Z-direction in FIGS. 4 and 5) to control the position of that respective portion of lens element 84 in the Z-direction. A lens shaping element (e.g., a ring-shaped element) may optionally be coupled to both lens element 84 and the actuators.

The example of tunable lens element 72-2 being a fluid-filled lens element is merely illustrative. In general, tunable lens element 72-2 may be any desired type of tunable lens element with adjustable optical power.

Figure 6:
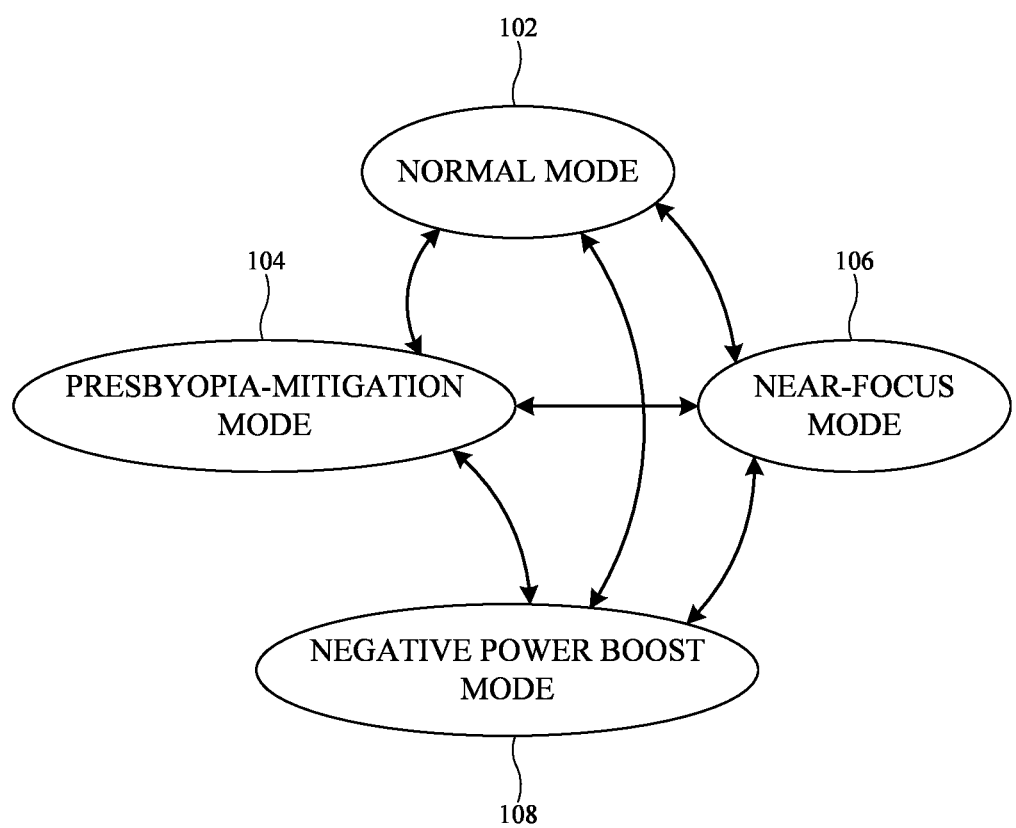
FIG. 6 is a state diagram showing illustrative modes of operation for a tunable lens in an electronic device in accordance with some embodiments.

FIG. 6 is a state diagram showing various modes of operation for tunable lens 72-2. Generally, the tunable lens 72-2 may be adjusted to compensate for the user's eyesight. As shown in FIG. 6, the tunable lens is operable in a normal mode 102. In the normal mode, the tunable lens may be set to compensate for a user's eyeglasses prescription. This may be the baseline mode that is used during normal operation of head-mounted device 10. When tunable lens 72-2 is in normal mode 102, the lens module 72 may provide an optical power that matches the user's eyeglasses prescription.

Tunable lens 72-2 may also be operable in one or more additional modes. FIG. 6 shows how the tunable lens is operable in a presbyopia-mitigation mode 104, a near-focus mode 106, and a negative power boost mode 108.

The presbyopia-mitigation mode 104 may be used when a user has presbyopia (a refractive error that diminishes the ability of the eye to focus on nearby objects). In the presbyopia-mitigation mode, the tunable lens may be adjusted to have additional positive optical power. For example, in presbyopia-mitigation mode 104 the spherical power of the tunable lens may be increased in a positive magnitude compared to normal mode 102. The magnitude of increase in spherical power of the tunable lens in mode 104 compared to mode 102 may be at least 0.25 diopters, at least 0.5 diopters, at least 1 diopter, at least 1.5 diopters, at least 2 diopters, less than 3 diopters, between 0.5 diopters and 3 diopters, between 1 diopter and 2 diopters, etc. In general, the spherical power may be tuned to any desired dioptric value in presbyopia-mitigation mode 104.

The near-focus mode 106 may be used when users without presbyopia are focusing on nearby objects. When users without presbyopia are focusing on nearby objects, the optical power of the tunable lens may be relaxed (e.g., shifted closer to 0 diopters). For example, a tunable lens with a negative spherical power in normal mode 102 may have its spherical power increased in mode 106 and a tunable lens with a positive spherical power in normal mode 102 may have its spherical power decreased in mode 106. This may be particularly useful for myopic (nearsighted) users. For myopic users, the tunable lens has a negative spherical power in normal mode 102.

The magnitude of change in spherical power of the tunable lens in mode 106 relative to mode 102 may be at least 0.25 diopters, at least 0.5 diopters, at least 1 diopter, at least 1.5 diopters, at least 2 diopters, at least 4 diopters, at least 6 diopters, less than 8 diopters, less than 3 diopters, between 0.5 diopters and 3 diopters, between 1 diopter and 2 diopters, etc. In general, the spherical power may be tuned to any desired dioptric value in near-focus mode 106.

In modes 104 and 106, there may be a threshold distance that defines nearby objects. In other words, objects that are closer to head-mounted device 10 than the threshold distance may be considered nearby objects and objects that are further from head-mounted device 10 than the threshold distance may not be considered nearby objects. Any desired distance may be used for the threshold distance (e.g., one meter, less than one meter, greater than one meter, etc.).

Negative power boost mode 108 may be used for users who may benefit from more negative optical power in low light level conditions and/or when the eye is fatigued (e.g., myopic users). In these conditions, a tunable lens with a negative spherical power in normal mode 102 may have its spherical power decreased in mode 108.

The magnitude of change in spherical power of the tunable lens in mode 108 relative to mode 102 may be at least 0.25 diopters, at least 0.5 diopters, at least 1 diopter, at least 1.5 diopters, at least 2 diopters, at least 4 diopters, at least 6 diopters, less than 8 diopters, less than 3 diopters, between 0.5 diopters and 3 diopters, between 1 diopter and 2 diopters, etc. In general, the spherical power may be tuned to any desired dioptric value in negative power boost mode.

Consider a first user with an eyeglass prescription of −3 diopters for spherical power. In this example, the first user also has presbyopia. In the normal mode 102, tunable lens 72-2 may have a spherical power of −3 diopters. In the presbyopia-mitigation mode 104, tunable lens 72-2 may have a spherical power of −2 diopters. In the negative power boost mode, tunable lens 72-2 may have a spherical power of −4 diopters.

Consider a second user with an eyeglass prescription of −6 diopters for spherical power. In this example, the second user does not have presbyopia. In the normal mode 102, tunable lens 72-2 may have a spherical power of −6 diopters. In the near-focus mode 106, tunable lens 72-2 may have a spherical power of −1 diopters. In the negative power boost mode, tunable lens 72-2 may have a spherical power of −8 diopters.

Consider a third user that does not have an eyeglass prescription but that has presbyopia. In the normal mode 102, tunable lens 72-2 may have a spherical power of 0 diopters. In the presbyopia-mitigation mode 104, tunable lens 72-2 may have a spherical power of +2 diopters.

Tunable lens 72-2 may be adjusted between any of modes 102, 104, 106, and 108 based on a variety of factors. Tunable lens 72-2 may default to normal mode 102. If head-mounted device 10 determines that the user is viewing a nearby object, the tunable lens may be switched to mode 104 (if the user has presbyopia) or mode 106 (if the user does not have presbyopia). If head-mounted device 10 determines that light levels are low, the tunable lens may be switched to mode 108. If head-mounted device 10 determines that the eye fatigue is high, the tunable lens may be switched to mode 108.

EOG sensors 53 and EMG sensors 55 may be used to gather information that is used to determine an optimal mode (e.g., one of modes 102, 104, 106, and 108) for tunable lens 72-2.

Figure 7:
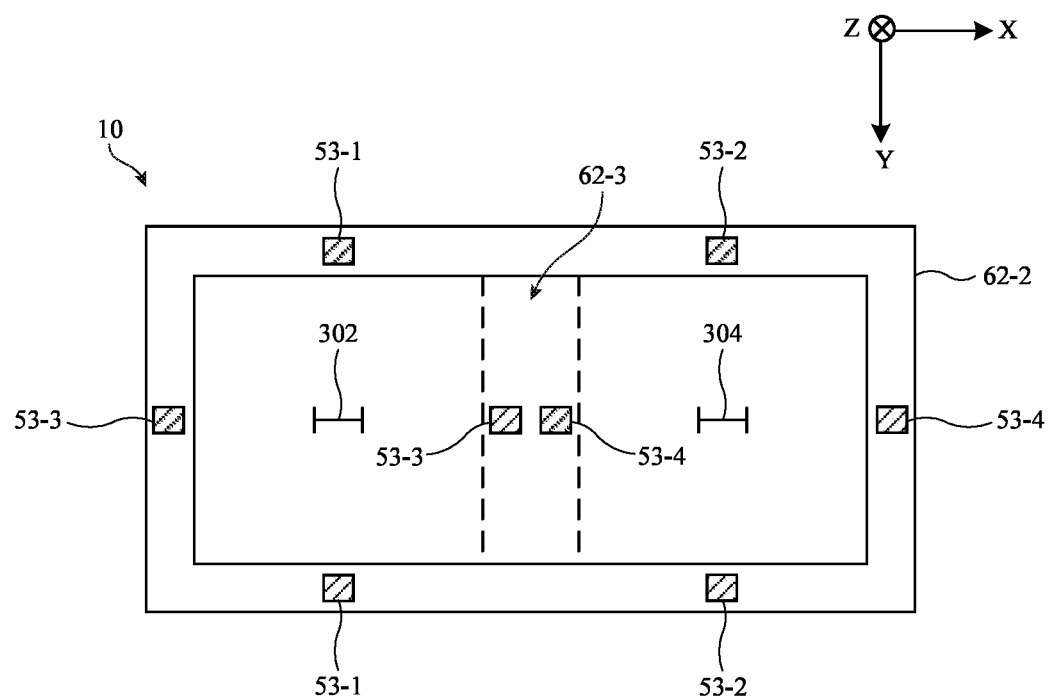
FIG. 7 is a side view of an illustrative head-mounted device with electrooculography (EOG) sensors in accordance with some embodiments.

As previously discussed, one or more EOG sensors 53 may be distributed around each eye of the user during operation of head-mounted device. FIG. 7 is a side view of head-mounted device 10 showing EOG sensors 53. As shown, support structure 62-2 may extend in a ring-shape around a central opening. The user's eyes may be aligned with (and view the physical environment through) the central opening when the head-mounted device is worn on the head of the user.

An optional nose-bridge portion 62-3 (sometimes referred to as nose-bridge support structure 62-3, nose-bridge support structure portion 62-3, etc.) may be included in head-mounted device. The nose-bridge portion 62-3 may be aligned with the user's nose when the head-mounted device is worn on the head of the user. The nose-bridge portion may at least partially define a first opening that is aligned with the first eye 302 and a second opening that is aligned with a second eye 304. Each eye may view the physical environment and/or displayed images through the respective opening. A tunable lens 72-2 may be aligned with each eye in each respective opening.

In the example of FIG. 7, a first pair 53-1 of EOG sensors 53 (sometimes referred to as EOG electrodes) is formed on opposing sides of eye 302. In particular, a first electrode is formed on support structure 62-2 above eye 302 and a second electrode is formed on support structure 62-2 below eye 302. A second pair 53-2 of EOG sensors 53 is formed on opposing sides of eye 304. In particular, a first electrode is formed on support structure 62-2 above eye 304 and a second electrode is formed on support structure 62-2 below eye 304. A third pair 53-3 of EOG sensors 53 is formed on opposing sides of eye 302. In particular, a first electrode is formed on support structure 62-2 to the left of eye 302 and a second electrode is formed on nose-bridge portion 62-3 to the right of eye 302. A fourth pair 53-4 of EOG sensors 53 is formed on opposing sides of eye 304. In particular, a first electrode is formed on support structure 62-2 to the right of eye 304 and a second electrode is formed on nose-bridge portion 62-3 to the left of eye 304.

The EOG sensors may be formed on a portion of support structure 62-2 that contacts the user's face when the head-mounted device is worn on the head of the user. The locations for the EOG sensors in FIG. 7 are merely illustrative. In general, the EOG sensors may be positioned at any desired location in head-mounted device that causes the EOG sensors to contact the user's skin and gather the desired data while remaining sufficiently comfortable for the user. The EOG sensors may be integrated into a rigid support structure that contacts the user's skin during operation, a compliant component (e.g., foam) that contacts the user's skin during operation, etc.

The EOG sensors may sense rotation of the user's eyes with sufficient precision and accuracy to reliably determine how far away the user is focusing their eyes. As an example, when the user is looking at a distant object the EOG sensors may sense a first amount of rotation/vergence in the eyes whereas when the user is looking at a near object the EOG sensors may sense a second amount of rotation/vergence in the eyes that is different than the first amount.

As previously discussed, one or more EMG sensors 55 may be incorporated into head-mounted device 10. The EMG sensors may, as one example, be used to sense contraction of the user's trapezius muscle. There is a correlation between contraction of the ciliary muscle in the human eye and the trapezius muscle. When a user is looking at a near object, the ciliary muscle contracts. When a user is looking at a distant object, the ciliary muscle relaxes. Ciliary muscle activity is therefore greater when a user is looking at a close object than a distant object. Similarly, trapezius muscle activity may be greater when a user is looking at a close object than a distant object. By sensing trapezius muscle activity, EMG sensors 55 may be able to reliably determine how far away the user is focusing their eyes.

Figure 8:
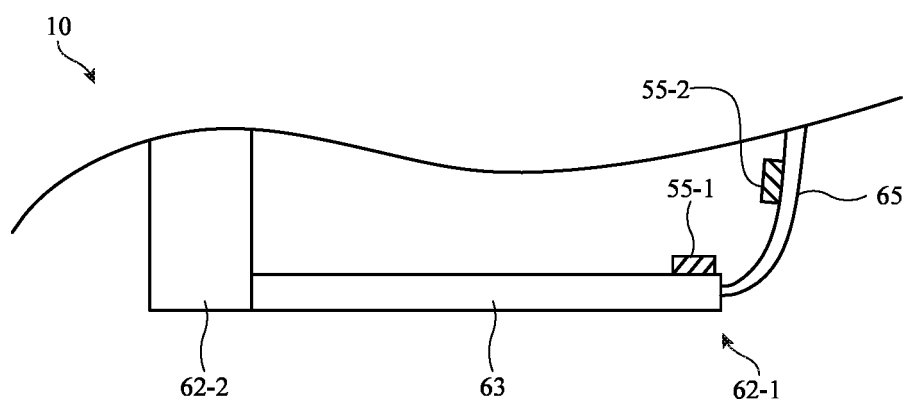
FIG. 8 is a side view of an illustrative head-mounted device with electromyography (EMG) sensors in accordance with some embodiments.

EMG sensors 55 may include one or more electrodes that are in contact with a user's skin at or near their trapezius muscle. FIG. 8 is a top view of an illustrative head-mounted device showing possible locations for EMG sensors 55. FIG. 8 shows support structures 62-2 that form a main unit (e.g., that houses lens module 70 with tunable lens 72-2) and support structures 62-1 that help to hold main unit 62-2 on a user's face. Support structures 62-1 may include eyeglass temples 63 (e.g., a first eyeglass temple on a left side of the device and a second eyeglass temple on a second side of the device) and/or a strap 65.

FIG. 8 shows how an EMG sensor 55-1 may be positioned on eyeglass temple 63. The eyeglass temple may have first and second opposing ends with the first end being coupled to main unit 62-2. The EMG sensor may be positioned on the second end of the eyeglass temple. In some cases, the eyeglass temple may be configured to extend below a user's ear when head-mounted device 10 is worn on a user's head such that the EMG sensor 55-1 contacts the user's skin at or near their trapezius muscle.

FIG. 8 also shows an example where an EMG sensor 55-2 is positioned on strap 65. In FIG. 8, strap 65 extends between eyeglass temples 63. This example is merely illustrative and strap 65 may instead be connected directly to main unit 62-2 if desired. The strap may have an EMG sensor 55-2 that is configured to be positioned at or near the user's trapezius muscle when head-mounted device 10 is worn on a user's head.

Figure 9:
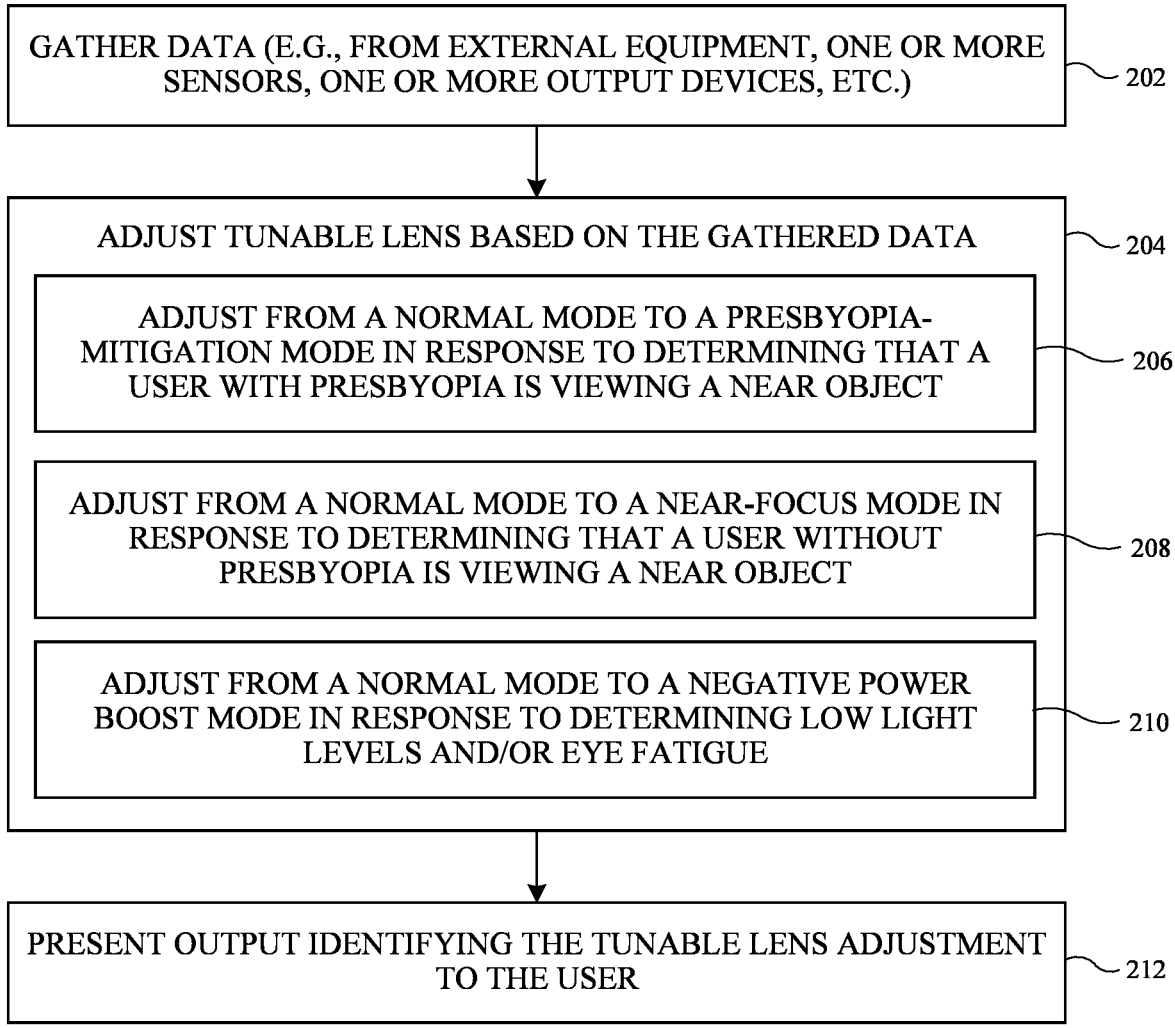
FIG. 9 is a flowchart of an illustrative method for operating an electronic device with a tunable lens in accordance with some embodiments.

FIG. 9 is a flowchart of an illustrative method of operating a head-mounted device 10 with a tunable lens. At step 202, the head-mounted device may gather data. The data may be gathered from external equipment 60, from one or more sensors in device 10, from one or more output devices in device 10, etc.

Head-mounted device 10 may wirelessly receive information from external equipment 60 at step 202. The information received from external equipment may, for example, indicate if the user is actively viewing the external equipment and/or a distance between the external equipment and the head-mounted device. The information received may include raw data (e.g., accelerometer data indicating a raise-to-wake gesture) and/or a notification that the external equipment is being actively viewed (without necessarily including raw data). External equipment 60 may estimate the distance between head-mounted device 10 and the external equipment using ultra-wideband (UWB) communications and/or depth sensing (e.g., using a LIDAR sensor in the external equipment).

Head-mounted device 10 may gather data from one or more sensors at step 202. The sensors used to gather data at step 202 may include inward-facing camera 22, outward-facing camera 24, microphone 26, position and motion sensors 28, ambient light sensor 30, magnetometer 32, heart rate monitor 34, depth sensor 36, temperature sensor 38, touch sensor 40, moisture sensor 42, gas sensor 44, barometer 46, gaze-tracking sensor 48, button 50, light-based proximity sensor 52, EOG sensor(s) 53, GPS sensor 54, EMG sensor(s) 55, etc.

As examples, images from outward-facing camera 24 may help identify if the user is actively viewing a nearby object. Position and motion sensors 28 may recognize head gestures associated with the user viewing a nearby object. Ambient light sensor 30 may detect low ambient light levels that trigger the negative power boost mode 108. Depth sensor 36 may help identify if the user is actively viewing a nearby object. Touch sensor 40 and/or button 50 may gather user input that is used to manually adjust a tunable lens. Gaze-tracking sensor 48 may help identify if the user is actively viewing a nearby object and/or may determine pupil size information used to assess light levels and/or eye fatigue. EOG sensor(s) 53 may sense rotation of the user's eye(s) to detect whether the user is focusing on a near object or a distant object. GPS sensor 54 may identify a location of the head-mounted device that influences adjustments of tunable lens 72-2. EMG sensor(s) 55 may sense contraction of a user's trapezius muscle to indicate whether the user is focusing on a near object or a distant object.

In general, data from any one of inward-facing camera 22, outward-facing camera 24, microphone 26, position and motion sensors 28, ambient light sensor 30, magnetometer 32, heart rate monitor 34, depth sensor 36, temperature sensor 38, touch sensor 40, moisture sensor 42, gas sensor 44, barometer 46, gaze-tracking sensor 48, button 50, light-based proximity sensor 52, EOG sensor(s) 53, GPS sensor 54, and EMG sensor(s) 55 may influence adjustments of tunable lens 72-2.

Head-mounted device 10 may gather data associated with one or more output devices at step 202. The data associated with an output device may include information on whether or not that output device is powered on and/or the type of content being presented if the output device is powered on. For example, the data gathered at step 202 may include information on whether display 18 in head-mounted device 10 is operating and what type of content is being presented on display 18.

The data gathered at step 202 may additionally include information on the number and/or type of applications installed on head-mounted device 10, the number and/or type of applications currently running on head-mounted device 10, information from an application running on head-mounted device 10, etc.

The data gathered at step 202 may include any other desired information (e.g., the time of day, the length of time the head-mounted device 10 has been operated, calendar information for the user of the head-mounted device, etc.).

In general, any of these types of data may influence adjustments of tunable lens 72-2.

Next, at step 204, head-mounted device 10 may adjust the tunable lens (e.g., tunable lens 72-2 based on the gathered data). Adjusting the tunable lens may include adjusting from a normal mode 102 to a presbyopia-mitigation mode 104 (as in step 206), adjusting from a normal mode 102 to a near-focus mode 106 (as in step 208), adjusting from a normal mode 102 to a negative power boost mode 108 (as in step 210), or any other desired adjustments.

Adjusting from a normal mode 102 to a presbyopia-mitigation mode 104 may be performed in response to determining that a user with presbyopia is viewing a nearby object. The determination that the user is viewing a nearby object may be based on information received from external equipment 60 (e.g., indicating that external equipment 60 is being actively viewed and is near head-mounted device 10). The determination that the user is viewing a nearby object may be based on information from one or more sensors in head-mounted device 10 (e.g., outward-facing camera 24 may identify a nearby object, depth sensor 36 may determine that an object is nearby, gaze-tracking sensor 48 may identify that a user's gaze is directed towards a nearby object, etc.). The determination that the user is viewing a nearby object may be based on calendar information for the user (e.g., indicating the user is working and therefore likely viewing a computer screen at a close distance). The determination that the user is viewing a nearby object may be based on location information from GPS sensor 54 (e.g., indicating the user is at a workplace and therefore likely viewing a computer screen at a close distance). The determination that the user is viewing a nearby object may be based on any other desired data gathered at step 202.

Adjusting from a normal mode 102 to a near-focus mode 106 may be performed in response to determining that a user without presbyopia is viewing a nearby object. The determination that the user is viewing a nearby object may be based on information received from external equipment 60 (e.g., indicating that external equipment 60 is being actively viewed and is near head-mounted device 10). The determination that the user is viewing a nearby object may be based on information from one or more sensors in head-mounted device 10 (e.g., outward-facing camera 24 may identify a nearby object, depth sensor 36 may determine that an object is nearby, gaze-tracking sensor 48 may identify that a user's gaze is directed towards a nearby object, etc.). The determination that the user is viewing a nearby object may be based on calendar information for the user (e.g., indicating the user is working and therefore likely viewing a computer screen at a close distance). The determination that the user is viewing a nearby object may be based on location information from GPS sensor 54 (e.g., indicating the user is at a workplace and therefore likely viewing a computer screen at a close distance). The determination that the user is viewing a nearby object may be based on any other desired data gathered at step 202.

Adjusting from a normal mode 102 to a negative power boost mode 108 may be performed in response to determining that light levels are low. The determination that the light levels are low may be based on a time of day (e.g., if the time of day is before sunrise or after sunset), sensor data (e.g., data from ambient light sensor 30, one or more images from inward-facing camera 22 and/or outward-facing camera 24, pupil size information from gaze-tracking sensor 48, etc.), information from external equipment 60 (e.g., ambient light data from external equipment 60), and/or any other desired data gathered at step 202.

An ambient light level measured by ambient light sensor 30 may be compared to a threshold. When the ambient light level is below the threshold, the tunable lens may switch from the normal mode 102 to the negative power boost mode 108.

A pupil size measured by inward-facing camera 22 and/or gaze-tracking sensor 48 may be compared to the user's baseline pupil size and/or a threshold. When the pupil size is greater than the user's baseline pupil size and/or the threshold, the tunable lens may switch from the normal mode 102 to the negative power boost mode 108.

Adjusting from a normal mode 102 to a negative power boost mode 108 may be performed in response to determining that eye fatigue levels are high. The determination that eye fatigue levels are high may be based on a time of day (e.g., if the time of day is late in the day), sensor data (e.g., data from gaze-tracking sensor 48, heart rate monitor 34, outward-facing camera 24, ambient light sensor 30, etc.), information from external equipment 60 (e.g., active viewing time information from an external electronic device), and/or any other desired data gathered at step 202.

Head-mounted device 10 may compare the current time of day to a threshold time of day. When the current time of day is later than the threshold time of day, the tunable lens may switch from the normal mode 102 to the negative power boost mode 108.

Head-mounted device 10 may compare an active viewing time received from external equipment 60 to a threshold. When the active viewing time is greater than the threshold (indicating likely eye fatigue), the tunable lens may switch from the normal mode 102 to the negative power boost mode 108.

Adjustments at step 204 may include adjustments based on display content (e.g., the type of content being displayed on display 18), adjustments in response to an external electronic device (e.g., cellular telephone, watch, vehicle infotainment system, etc.) detecting fixation on the external electronic device, ambient light levels detected by ambient light sensor 30, pupil size measured by gaze-tracking sensor 48 and/or inward-facing camera 22, etc. As an example, the data gathered at step 202 may include a virtual image distance (VID) for augmented-reality display content that is presented using display 18 and the adjustment at step 204 may include adjustments based on the virtual image distance. The adjustment at step 204 may include adjusting the lens power for those unable to accommodate to the current virtual image distance and/or adjusting the lens power to help the user focus on the displayed content. In some cases, the virtual image distance may be adjusted by display 18 based on the user's eyesight (e.g., the VID may be set to infinity for presbyopes and set to a smaller value for non-presbyopes).

In some cases, display 18 may have a function in the rendering pipeline to apply selective blur on the displayed content emphasizing the location at which the user should focus and pointing out remaining elements that should be out of focus and/or at different distances.

Display 18 may, based on the time of day, change the chromaticity of presented content. For example, display 18 may reduce the proportion of blue light displayed at night. The lens may be adjusted at step 204 based on the chromatic content and operating mode of display 18.

Adjustments at step 204 may include adjustments to one or more lenses in a display with a waveguide. For example, a display may include a waveguide, a front bias lens, and a back bias lens. The front bias lens and/or back bias lens may be adjusted at step 204 to shift the virtual content distance.

Adjustments performed at step 204 may be performed gradually over a transition period having a duration. The duration of the transition period may be greater than 0.01 seconds, greater than 0.1 seconds, greater than 0.5 seconds, greater than 1 second, greater than 10 seconds, greater than 1 minute, greater than 10 minutes, less than 10 seconds, less than 1 second, etc. The transition period may vary depending on the type of transition. For example, a transition period for a switch between modes 102 and 104 may be different than a transition period for a switch between modes 102 and 108. If desired, the duration of the transition period may be adjusted based on any of the data gathered at step 202. As an example, the transition period between modes 102 and 104 may have a first duration in some circumstances (e.g., if the user is determined to be playing a sport) but a second duration in other circumstances (as determined using data from step 202).

In certain medical conditions, a user's prescription is known to vary over time. Adjustments performed at step 204 may therefore be based on a user's medical condition to compensate for the changes to the user's prescription caused over time by the medical condition.

The adjustments performed at step 204 may be used to balance monovision.

As shown in FIG. 9, head-mounted device 10 may present output identifying the tunable lens adjustment to the user at step 212. The output may be presented before, during, and/or after the adjustment of step 204. The output may include visual output (e.g., an icon, text notification, or other visual indicator) presented by display 18. Instead or in addition, the output may include audio output (e.g., a chime, sound effect, song, voice notification, or other audible indicator) presented by speaker 20. Instead or in addition, the output may include haptic output from a haptic output device.

The output at step 212 may include displaying an arrow or other indicator that conveys the type of adjustment being made at step 204. For example, when switching into presbyopia-mitigation mode 104 display 18 may present an arrow or other indicator that identifies the lens is being optimized for short distances (e.g., reading). If the user is reading an external electronic device, display 18 may present an arrow that points to the external electronic device when adjusting the lens at step 204. Output may be presented at step 212 both when the adjustment to the lens is performed automatically based on sensor data and when the adjustment to the lens is performed manually by the user using user input.

Display 18 may be presenting augmented-reality content when the adjustment at step 204 is performed. In this case, the size of the augmented-reality content may be adjusted at step 212 to compensate for the adjustment in the lens.

In the arrangement described herein, lens module 72 may have a baseline optical power that compensates for a user's eyeglass prescription. Tunable lens 72-2 may then make adjustments to the baseline optical power as needed during operation of head-mounted device (e.g., switching between modes 102, 104, 106, and 108, adjusting the baseline optical power if a user's prescription changes, etc.).

In some cases, a user may have different prescriptions for different use cases (e.g., a first prescription for reading and a second prescription for driving). In this case, the tunable lens may be adjusted to change the total optical power of lens module between the different prescriptions. In the flowchart of FIG. 9, the tunable lens may be adjusted between a first mode for the first prescription and a second mode for the second prescription at step 204 if desired. Adjusting between the first mode for the first prescription and the second mode for the second prescription may be performed based on location information (e.g., the first mode may be more likely in a workplace or home environment), sensor data (e.g., identifying when the user is driving), calendar information (e.g., the calendar information may identify that the user is working and therefore in need of using the first prescription), etc.

In general, the user may set any desired number of preset modes for tunable lens 72-2 and assign any desired triggers for switching into those modes. For example, the user may define an office mode, a theater mode, and a sports mode. The tunable lens may be switched into the office mode when the user is determined to be working at an office. The tunable lens may be switched into the theater mode when the user is determined to be viewing visual content at a theater. The tunable lens may be switched into the sports mode when the user is determined to be playing a sport.

Generally, the tunable lens may be automatically switched into a given mode when a trigger associated with the given mode is detected.

During use of head-mounted device 10, the user may be introduced to the adjustments enabled by tunable lens 72-2 at any desired pace. For example, the user may wish to add the adjustments over the course of hours, weeks, months, etc. to ensure a comfortable adaptation period. The pace may be controlled directly by the user of head-mounted device 10 or by an authorized third party (e.g., an optometrist).

The user may manually select adjustments to the lens based on recommendations from device 10, the adjustments to the lens may be performed automatically by device 10, and/or the user may decide in which situations to make automatic adjustments and in which situations to make manual adjustments.

In general, an authorized third party (e.g., an optometrist) may adjust any aspect of the behavior of the tunable lens if desired.

Head-mounted device 10 may, in general, be used in place of eyeglasses for vision correction if desired by the user.

In FIG. 9, the adjustment of step 204 is performed automatically based on the gathered data from step 202. However, this example is merely illustrative. If desired, head-mounted device 10 may instead suggest the adjustment to the tunable lens and await user input that either approves or declines the adjustment. The head-mounted device may suggest the adjustment using display 18, speaker 20, or a haptic output device such as a vibration motor. The user may approve or decline the suggested adjustment by pressing button 50, touching touch sensor 40, providing gaze input using gaze-tracking sensor 48, providing a voice command using microphone 26, and/or using any other desired user input.

It is noted that the adjustment at step 204 may be performed manually based on user input provided to head-mounted device 10. The user may provide the user input to a component on head-mounted device 10 (e.g., by pressing button 50, touching touch sensor 40, providing gaze input using gaze-tracking sensor 48, providing a voice command using microphone 26, etc.). In another possible arrangement, the user may provide the user input to a paired electronic device (e.g., external equipment 60 such as a cellular telephone, watch, etc.). The external equipment may transmit the instructions for the tunable lens to head-mounted device 10 based on the user input to the external equipment. The input device that receives user input for adjusting the tunable lens may include a digital crown or other rotatable input mechanism, a touch sensor with an elongated shape, etc.

If desired, lens module 72 may include tunable tint functionality. In other words, the lens module 72 may include a layer or lens element that has an adjustable transparency. The transparency of the adjustable transparency layer may be adjusted based on any of the data gathered at step 202. The transparency may be adjusted across the entire lens module or in only a subset of the lens module. For example, in outdoor sunny conditions with bright ambient light, the lens module may be tinted (e.g., the adjustable transparency layer has its transparency reduced). If desired, the tint may be lower in a bottom of the field-of-view of lens module 72 than in the remaining field-of-view of lens module 72 to allow the user to view a watch or cellular telephone through a higher transparency portion of the lens module.

If desired, adjustments to the adjustable lens may be manually or automatically disabled during certain periods of time. For example, the user may request that adjustments are disabled when they are driving. The user may request that adjustments are automatically disabled at any desired location and/or during any desired activity.

The foregoing is merely illustrative and various modifications can be made to the described embodiments. The foregoing embodiments may be implemented individually or in any combination.

What is claimed is:

1. An electronic device, comprising:
   a head-mounted support structure;
   one or more sensors coupled to the head-mounted support structure; and
   a lens module coupled to the head-mounted support structure, wherein the lens module comprises a tunable lens that is configured to:
   in response to a determination, based on data from the one or more sensors, that a nearby object is being viewed through the lens module, change from a first mode in which the lens module has a first spherical power to a second mode in which the lens module has a second spherical power that is greater than the first spherical power, wherein the tunable lens is configured to change from the first mode to the second mode during a transition period and wherein the transition period has a duration that is greater than 0.1 seconds.

2. The electronic device defined in claim 1, wherein the one or more sensors comprises a depth sensor and wherein the data from the one or more sensors comprises data from the depth sensor.

3. The electronic device defined in claim 1, wherein the one or more sensors comprises an outward-facing camera and wherein the data from the one or more sensors comprises data from the outward-facing camera.

4. The electronic device defined in claim 1, wherein the one or more sensors comprises a gaze-tracking sensor and wherein the data from the one or more sensors comprises data from the gaze-tracking sensor.

5. The electronic device defined in claim 1, wherein the duration is greater than 0.5 seconds.

6. The electronic device defined in claim 1, further comprising:
   an output device that is configured to provide output indicating that the tunable lens is changing from the first mode to the second mode.

7. The electronic device defined in claim 6, wherein the output device comprises a display.

8. The electronic device defined in claim 6, wherein the output device comprises a speaker.

9. The electronic device defined in claim 6, wherein the output device comprises a haptic output device.

10. An electronic device, comprising:
    a head-mounted support structure;
    one or more sensors coupled to the head-mounted support structure; and
    a lens module coupled to the head-mounted support structure, wherein the lens module comprises a tunable lens that is configured to:
    in response to a determination, based on data from the one or more sensors, that a nearby object is being viewed through the lens module, change from a first mode in which the lens module has a first spherical power to a second mode in which the lens module has a second spherical power that is greater than the first spherical power, wherein the first mode is a normal mode and wherein the second mode is a presbyopia-mitigation mode.

11. An electronic device, comprising:
a head-mounted support structure;
one or more sensors coupled to the head-mounted support structure; and
a lens module coupled to the head-mounted support structure, wherein the lens module comprises a tunable lens that is configured to:
based on data from the one or more sensors and based on a time of day, change from a first mode in which the lens module has a first spherical power to a second mode in which the lens module has a second spherical power that is less than the first spherical power.

12. The electronic device defined in claim 11, wherein the first spherical power is a negative spherical power.

13. The electronic device defined in claim 11, wherein the one or more sensors comprises a gaze-tracking sensor and wherein the data from the one or more sensors comprises data from the gaze-tracking sensor.

14. The electronic device defined in claim 11, wherein the one or more sensors comprises a camera and wherein the data from the one or more sensors comprises data from the camera.

15. The electronic device defined in claim 11, wherein the one or more sensors comprises an electrooculography sensor.

16. The electronic device defined in claim 11, wherein the one or more sensors comprises an electromyography sensor.

17. An electronic device, comprising:
a head-mounted support structure;
one or more sensors coupled to the head-mounted support structure, wherein the one or more sensors comprises an ambient light sensor; and
a lens module coupled to the head-mounted support structure, wherein the lens module comprises a tunable lens that is configured to:
based on data from the ambient light sensor, change from a first mode in which the lens module has a first spherical power to a second mode in which the lens module has a second spherical power that is less than the first spherical power, wherein the tunable lens is configured to change from the first mode to the second mode in response to an ambient level detected by the ambient light sensor being below a threshold.

18. An electronic device, comprising:
a head-mounted support structure;
one or more sensors coupled to the head-mounted support structure; and
a lens module coupled to the head-mounted support structure, wherein the lens module comprises a tunable lens that is configured to:
based on data from the one or more sensors and based on location information, change from a first mode in which the lens module has a first spherical power to a second mode in which the lens module has a second spherical power that is less than the first spherical power.

19. An electronic device, comprising:
a head-mounted support structure;
one or more sensors coupled to the head-mounted support structure; and
a lens module coupled to the head-mounted support structure, wherein the lens module comprises a tunable lens that is configured to:
based on data from the one or more sensors and based on calendar information, change from a first mode in which the lens module has a first spherical power to a second mode in which the lens module has a second spherical power that is less than the first spherical power.

20. An electronic device, comprising:
a head-mounted support structure;
a lens module coupled to the head-mounted support structure, wherein the lens module comprises a tunable lens that is configured to change from a first mode in which the lens module has a first spherical power to a second mode in which the lens module has a second spherical power that is different than the first spherical power; and
an output device coupled to the head-mounted support structure, wherein the output device is configured to provide output indicating that the tunable lens is changing from the first mode to the second mode.

* * * * *